United States Patent
Kurabayashi (10) Patent No.: US 10,058,781 B2
(45) Date of Patent: Aug. 28, 2018

(54) RENDERING OF GAME CHARACTERS

(71) Applicant: Empire Technology Development LLC, Wilmington, DE (US)

(72) Inventor: Shuichi Kurabayashi, Fujisawa (JP)

(73) Assignee: Empire Technology Development LLC, Wilmington, DE (US)

( * ) Notice: Subject to any disclaimer, the term of this patent is extended or adjusted under 35 U.S.C. 154(b) by 275 days.

(21) Appl. No.: 14/784,427

(22) PCT Filed: Feb. 3, 2014

(86) PCT No.: PCT/US2014/014403
§ 371 (c)(1),
(2) Date: Oct. 14, 2015

(87) PCT Pub. No.: WO2015/116228
PCT Pub. Date: Aug. 6, 2015

(65) Prior Publication Data
US 2017/0319962 A1    Nov. 9, 2017

(51) Int. Cl.
| | | |
|---|---|---|
| G09G 5/00 | (2006.01) |
| A63F 13/53 | (2014.01) |
| A63F 13/52 | (2014.01) |
| A63F 13/35 | (2014.01) |
| G06F 3/048 | (2013.01) |

(52) U.S. Cl.
CPC .............. *A63F 13/53* (2014.09); *A63F 13/35* (2014.09); *A63F 13/52* (2014.09); *G06F 3/048* (2013.01)

(58) Field of Classification Search
CPC ........ G09G 2340/0407; G09G 2340/04; A63F 13/53

USPC .......................................................... 345/428
See application file for complete search history.

(56) References Cited

U.S. PATENT DOCUMENTS

| | | |
|---|---|---|
| 6,765,574 B1 | 7/2004 | Mao et al. |
| 8,147,339 B1 | 4/2012 | Perry |
| 2005/0253843 A1 | 11/2005 | Losasso Petterson et al. |
| 2010/0023406 A1* | 1/2010 | Bhogal ............... G06Q 30/02 705/14.66 |
| 2010/0091018 A1 | 4/2010 | Tatarchuk et al. |
| 2010/0134500 A1 | 6/2010 | Chang |
| 2011/0072367 A1* | 3/2011 | Bauer ............... G06F 3/04815 715/757 |
| 2012/0188277 A1 | 7/2012 | Hebbar et al. |
| 2013/0307847 A1* | 11/2013 | Dey ..................... G06T 1/00 345/419 |

OTHER PUBLICATIONS

"Global MMO Games Spending Exceeds $12 Billion," accessed at https://web.archive.org/web/20130914035512/http://www.superdataresearch.com/blog/global-mmo-games-spending-exceeds-12bn/, Jul. 12, 2012, pp. 4.

(Continued)

*Primary Examiner* — Hai Tao Sun (57) ABSTRACT

Technologies are generally described for rendering a character for games. In some examples, a method performed under control of a game server may include calculating a level of detail (LOD) for a first character positioned in a same virtual game space as a second character, based at least in part on a calculated degree of closeness between the first character and the second character; and controlling a display definition of the first character based at least in part on the calculated LOD.

15 Claims, 6 Drawing Sheets

(56) References Cited

OTHER PUBLICATIONS

Billieux, J., et al., "Why do you play World of Warcraft? An in-depth exploration of self-reported motivations to play online and in-game behaviours in the virtual world of Azeroth," Computers in Human Behavior, vol. 29, Issue 1, pp. 103-109 (2012).
Dent, S., "NVIDIA's GRID VCA now available to graphic crunching pros at a cool $24,900," (2013) accessed at https://web.archive.org/web/20131217002222/http://www.engadget.com/2013/03/20/nvidias-grid-vca-now-available/, accessed on Sep. 19, 2015, pp. 2.
Garcia, D., et al., "Social Resilience in Online Communities: The Autopsy of Friendster," Proceedings of the first ACM conference on Online social networks, pp. 39-50 (Feb. 22, 2013).
International Search Report and Written Opinion for International Application No. PCT/US2014/014403 dated May 16, 2014.
Mehrabi, A., and Haghighat, A.T., "Discovering the Rules in a Poker Player's Mind Based on the Association Rule Mining," International Conference on Computer Technology and Development, vol. 2, pp. 189-193 (Nov. 13-15, 2009).
Wißner, M., et al., "Level of Detail AI for Virtual Characters in Games and Simulation," Proceedings of the Third international conference on Motion in games, vol. 6459, pp. 206-217 (2010).

* cited by examiner

RENDERING OF GAME CHARACTERS

CROSS-REFERENCE TO RELATED APPLICATION

This Application is the U.S. National Stage filing under 35 U.S.C. § 371 of International Application No. PCT/US2014/014403, filed on Feb. 3, 2014. The disclosure of International Application No. PCT/US2014/014403 is hereby incorporated herein by reference in its entirety.

BACKGROUND

Massively multiplayer online role-playing game (MMORPG) is a genre of role-playing video games or web browser-based games in which a very large number of players interact with one another within a virtual game world. As in all RPGs, players assume the role of a character (often in a fantasy world or science-fiction world) and take control over many of that character's actions. MMORPGs are distinguished from single-player or small multi-player online RPGs by the number of players, and by the game's persistent world, which continues to exist and evolve while the player is offline and away from the game.

SUMMARY

In an example, a method performed under control of a game server may include calculating a level of detail (LOD) for a first character positioned in a same virtual game space as a second character, based at least in part on a calculated degree of closeness between the first character and the second character; and controlling a display definition of the first character based at least in part on the calculated LOD.

In another example, a game server may include a calculating unit configured to calculate a level of detail (LOD) for a first character positioned in a same virtual game space as a second character, based at least in part on a calculated degree of closeness between the first character and the second character; and a display definition control unit configured to control a display definition of the first character based at least in part on the calculated LOD.

In yet another example, a computer-readable storage medium having stored thereon computer-executable instructions that, in response to execution, may cause a game server to perform operations including: calculating a level of detail (LOD) for a first character positioned in a same virtual game space as a second character, based at least in part on a calculated degree of closeness between the first character and the second character; and controlling a display definition of the first character based at least in part on the calculated LOD.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a game character rendering scheme. Technologies are generally described for a method for controlling a display definition of a game character based in part on a calculated level of detail for the game character and for rendering the game character with the controlled display definition.

In some examples, a first character and a second character of a virtual game may be displayed on an end device. A game server may be configured to calculate a degree of closeness between the first character and the second character, based at least in part on a history of mutual activity between the first character and the second character in a virtual game space. Non-limiting examples of the mutual activity may include a frequency of occurrences in which the first character and the second character are included in a same character party, or a frequency of occurrences in which the first character and the second character execute a collaborative attack against an opposing character (e.g., a monster character). For example, the more the first character and the second character are included in a same character party, the game server may be configured to determine the degree of closeness between the first character and the second character to be the higher.

Further, the game server may be configured to determine a level of detail (LOD) for the first character in accordance with the calculated degree of closeness between the first character and the second character. The game server may be further configured to control a display definition of a 2D or 3D image of the first character based in part on the determined level of detail for the first character. In some embodiments, the game server may be configured to reduce a number of polygons used to render the first character, as the level of detail decreases. On the contrary, the game server may be configured to increase the number of polygons used to render the first character, as the level of detail increases.

Further, the game server may be configured to render the first character with the controlled number of polygons to be displayed on the end device. Accordingly, it is possible to render a game character to which a user pays more attention with a relatively higher definition, and to reduce graphic resources for rendering a game character to which a user does not pay much attention.

Figure 1:
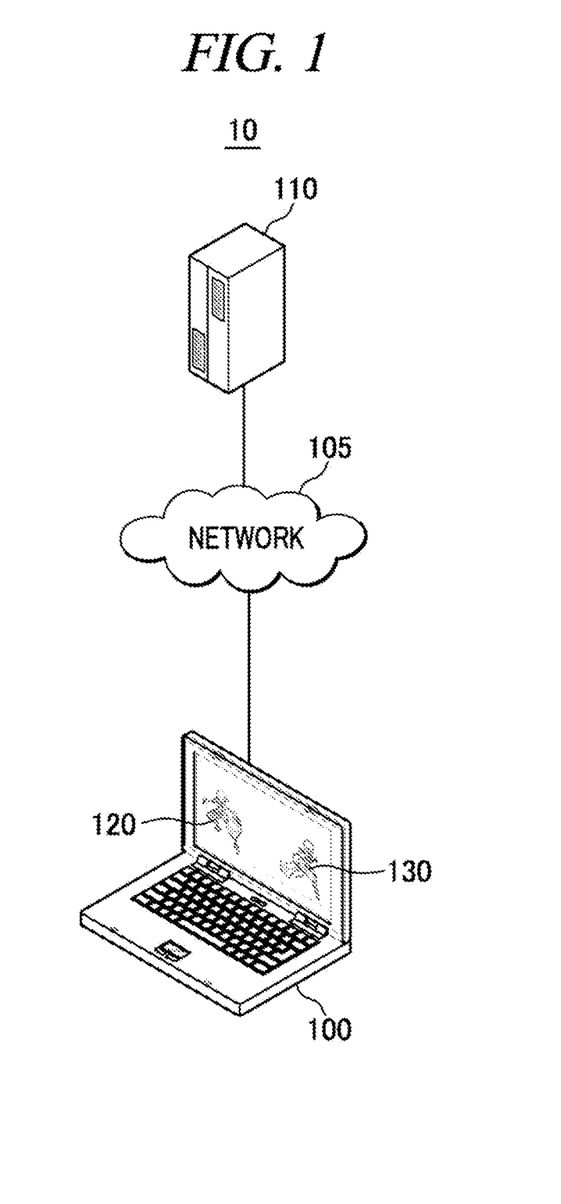
FIG. 1 schematically shows an illustrative example of an environment including an end device and a game server, arranged in accordance with at least some embodiments described herein.

FIG. 1 schematically shows an illustrative example of an environment 10 including at least one end device 100 and a game server 110, arranged in accordance with at least some embodiments described herein. As illustrated in FIG. 1, end device 100 and game server 110 may be connected to each other via a network 105.

End device 100 may be configured to display a first character 120 and a second character 130 on a display that is part of, or communicatively coupled to, end device 100. For example, it may be assumed that second character 130 refers to a game character which is controlled by a user of end device 100 and first character 120 refers to a game character which is controlled by another user or entity and positioned in a same virtual game space as second character 130.

As a non-limiting example, end device 100 may refer to a notebook computer; a personal computer; a smart phone; a tablet computer; a phablet device; and/or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

By way of example, but not as a limitation, network 105 between end device 100 and game server 110 may include all kinds of wireless networks, non-limiting examples of which may include a mobile radio communication network, a satellite network, a bluetooth, WiBro (Wireless Broadband Internet), Mobile WiMAX, HSDPA (High Speed Downlink Packet Access) or the like.

Game server 110 may refer to one or more apparatuses or servers that are hosted on or by a game service providing organization or entity. In some embodiments, game server 110 may be configured to calculate a degree of closeness between first character 120 and second character 130, based at least in part on a history of mutual activity between first character 120 and second character 130 in a virtual game space. For example, the closeness may refer to a relationship or communication between at least two characters or players in a virtual game space. Non-limiting examples of the history of mutual activity may include at least one of first character 120 and second character 130 being included in a same character party for a predetermined amount of time, a frequency of occurrences in which first character 120 and second character 130 are included in the same character party, a frequency of occurrences in which first character 120 and second character 130 execute a collaborative attack against an opposing character (e.g., a monster character), or a frequency of occurrences in which first character 120 and second character 130 interact with each other (e.g., a chat between first character 120 and second character 130).

In some embodiments, game server 110 may be configured to predefine various weight coefficients, each of which corresponds to various kinds of mutual activities. For example, game server 110 may be configured to assign a relatively higher weight coefficient to the occurrence in which first character 120 and second character 130 execute a collaborative attack against an opposing character than the occurrence in which first character 120 and second character 130 are included in the same character party. Game server 110 may be configured to then calculate the degree of closeness between first character 120 and second character 130 by using the frequency of each mutual activity and the weight coefficients assigned to each mutual activity. For another example, game server 110 may be configured to predefine a weight coefficient according to the amount of time for which first character 120 and second character 130 are included in a same character party. Game server 110 may be configured to assign the higher weight coefficient, as first character 120 and second character 130 are included in the same character party for the much amount of time. Game server 110 may be configured to then calculate the degree of closeness between first character 120 and second character 130 by using the amount of time for which first character 120 and second character 130 are included in the same character party and the assigned weight coefficients.

Game server 110 may be configured to store the history of mutual activity between first character 120 and second character 130 in a memory that is part of, or communicatively coupled to, game server 110. Game server 110 may be further configured to update the memory in real time or at predetermined time intervals. Further, game server 110 may be configured to calculate the degree of closeness between first character 120 and second character 130 in real time or at predetermined time intervals, using the updated history of mutual activity.

Further, game server 110 may be configured to calculate a distance between first character 120 and second character 130 in the virtual game space. The distance may be measured as spatial proximity in the virtual game space. In some embodiments, game server 110 may be configured to trace or detect a current position of first character 120 and a current position of second character 130 in the same virtual game space. Further, game server 110 may be configured to store the traced or detected current positions of first character 120 and second character 130 in a memory. Game server 110 may be configured to calculate the distance between first character 120 and second character 130, based at least in part on the current position of first character 120 and the current position of second character 130.

Game server 110 may be configured to calculate a level of detail for first character 120 positioned in the same virtual game space as second character 130, based at least in part on at least one of the calculated degree of closeness between first character 120 and second character 130 or the calculated distance between first character 120 and second character 130. In some embodiments, as the calculated degree of closeness between first character 120 and second character 130 is the higher, game server 110 may be configured to determine a level of detail for first character 120 to be the higher. Further, as the calculated distance between first character 120 and second character 130 is the shorter, game server 110 may be configured to determine a level of detail for first character 120 to be the higher.

Game server 110 may be configured to control a display property of first character 120 based at least in part on the calculated level of detail for first character 120. By way of example, but not as a limitation, the display property may include at least one of a display definition, a transparency, a visibility, a chroma, or a resolution. In some embodiments, game server 110 may be configured to control a number of polygons (e.g., vertices) used to render first character 120 based on the calculated level of detail for first character 120 in order to control the display definition of first character 120. Game server 110 may be configured to reduce the number of polygons, relative to a predefined standard number of polygons, as the calculated level of detail for first character 120 decreases. For example, the standard number of polygons may refer to a number of polygons with which a character is rendered in a normal state. On the contrary, game server 110 may be configured to increase the number of polygons, relative to the standard number of polygons, as the calculated level of detail for first character 120 increases.

In some other embodiments, game server 110 may be configured to control the number of polygons used to render first character 120 based on the calculated distance between first character 120 and second character 130 in the virtual game space in order to control the display definition of first character 120. Game server 110 may be configured to reduce the number of polygons, relative to a predefined standard number of polygons, as the distance between first character 120 and second character 130 increases. On the contrary, game server 110 may be configured to increase the number of polygons, relative to the standard number of polygons, as the distance between first character 120 and second character 130 decreases.

Further, game server 110 may be configured to control the number of polygons used to render first character 120 in real time or at predetermined time intervals, as game server 110 calculates the level of detail for first character 120 or the distance between first character 120 and second character 130 in real time or at predetermined time intervals.

Game server 110 may be configured to render first character 120 having the controlled display definition to be displayed on end device 100. Game server 110 may be configured to render first character 120 with the controlled number of polygons. For example, the controlled number of polygons may refer to the reduced or increased number of polygons relative to the standard number of polygons. In some embodiments, game server 110 may be configured to encode an image of first character 120 into a video stream, and to transmit the video stream to end device 100. Then, a 2D or 3D image of first character 120, which is formed from the controlled number of polygons, may be displayed on end device 100.

Accordingly, if the level of detail for first character 120 is relatively higher, a larger number of polygons may be used to render first character 120, so a relatively much fine and delicate 2D or 3D image of first character 120 may be displayed on end device 100. On the contrary, if the level of detail for first character 120 is relatively lower, a smaller number of polygons may be used to render first character 120, so a relatively much flat and blur 2D or 3D image of first character 120 may be displayed on end device 100.

Figure 2:
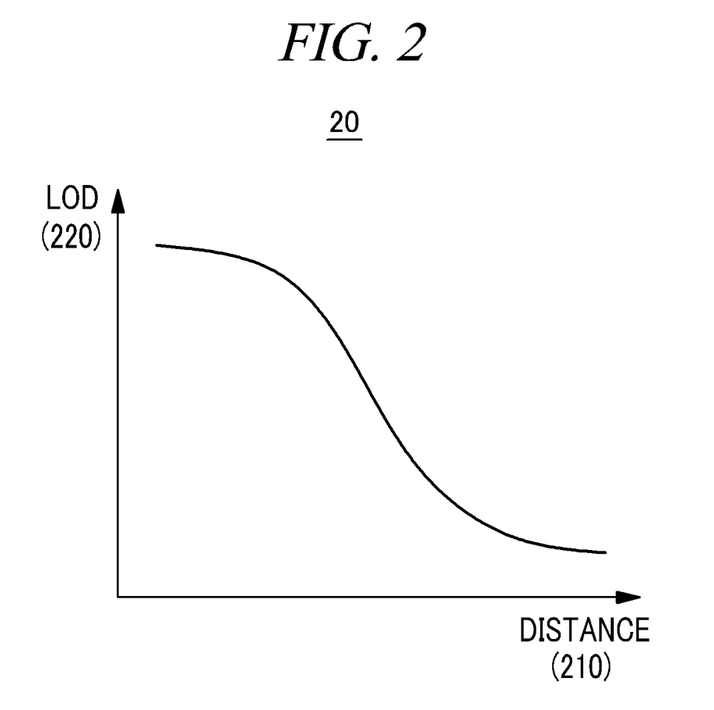
FIG. 2 schematically shows an illustrative example graph showing a level of detail in accordance with a distance between two characters, arranged in accordance with at least some embodiments described herein.

FIG. 2 schematically shows an illustrative example 20 graph showing a level of detail in accordance with a distance between two characters, arranged in accordance with at least some embodiments described herein. As depicted in FIG. 2, an x-axis may refer to a distance 210 between first character 120 and second character 130, and a y-axis may refer to a level of detail 220 for first character 120. As depicted in FIG. 2, as distance 210 between first character 120 and second character 130 increases, level of detail 220 for first character 120 decreases. Although, in FIG. 2, level of detail 220 for first character 120 is depicted to be changed in an S-shape curve, level of detail 220 for first character 120 may be changed having other tendency. For example, level of detail 220 for first character 120 may be decreased while drawing a straight line, as distance 210 between first character 120 and second character 130 increases. For another example, level of detail 220 for first character 120 may be decreased step by step, as distance 210 between first character 120 and second character 130 is larger than a threshold value.

Figure 3:
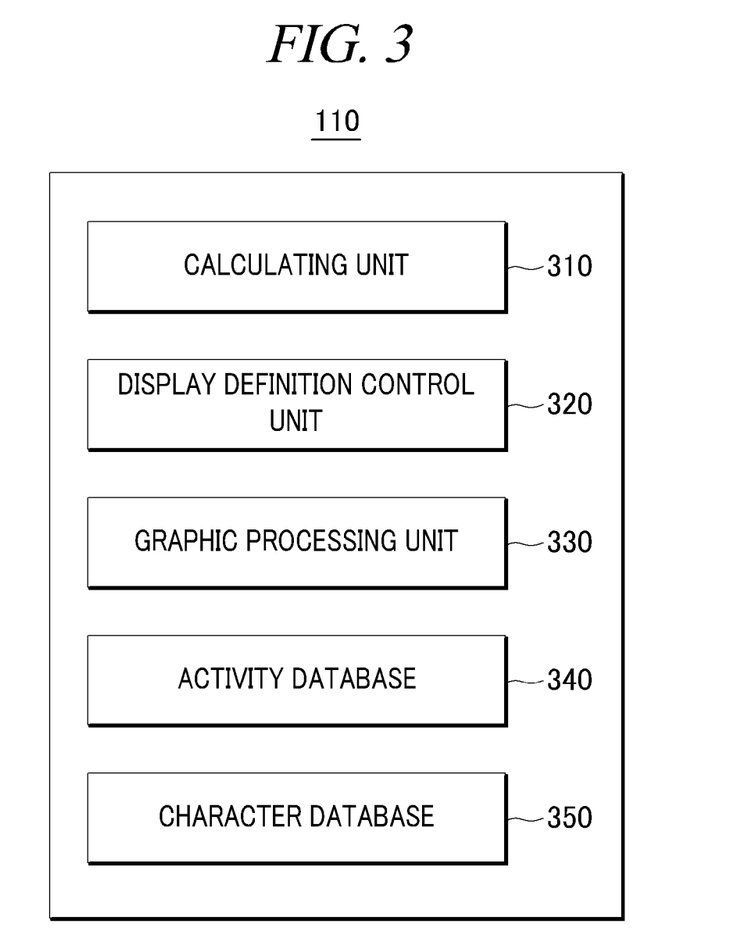
FIG. 3 shows a schematic block diagram illustrating an example architecture for a game server, arranged in accordance with at least some embodiments described herein.

FIG. 3 shows a schematic block diagram illustrating an example architecture for a game server 110, arranged in accordance with at least some embodiments described herein. As depicted in FIG. 3, game server 110 may include a calculating unit 310, a display definition control unit 320, a graphic processing unit (GPU) 330, an activity database 340, and a character database 350. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of calculating unit 310, display definition control unit 320, graphic processing unit 330, activity database 340, and character database 350 may be included in an instance of an application hosted on game server 110.

Calculating unit 310 may be configured to calculate a degree of closeness between first character 120 and second character 130 based at least in part on a history of mutual activity between first character 120 and second character 130 in a same virtual game space. Calculating unit 310 may be configured to calculate the degree of closeness between first character 120 and second character 130 in real time or at predetermined time intervals.

Non-limiting examples of the history of mutual activity may include at least one of first character 120 and second character 130 being included in a same character party for a predetermined amount of time, a frequency of occurrences in which first character 120 and second character 130 are included in the same character party, a frequency of occurrences in which first character 120 and second character 130 execute a collaborative attack against an opposing character (e.g., a monster character), or a frequency of occurrences in which first character 120 and second character 130 interact with each other (e.g., a chat between first character 120 and second character 130).

In some embodiments, calculating unit 310 may be configured to assign various weight coefficients to various kinds of mutual activities. For example, but not as a limitation, game server 110 may be configured to assign a relatively higher weight coefficient to the occurrence in which first character 120 and second character 130 execute a collaborative attack against an opposing character than the occurrence in which first character 120 and second character 130 are included in the same character party. Calculating unit 310 may be configured to then calculate the degree of closeness between first character 120 and second character 130 by using the frequency of each mutual activity and the weight coefficients assigned to each mutual activity.

For another example, calculating unit 310 may be configured to predefine various weight coefficients according to the amount of time for which first character 120 and second character 130 are included in a same character party. Calculating unit 310 may be configured to assign the higher weight coefficient, as first character 120 and second character 130 are included in a same character party for the much amount of time. Calculating unit 310 may be configured to then calculate the degree of closeness between first character 120 and second character 130 by using the amount of time for which first character 120 and second character 130 are included in the same character party and the assigned weight coefficients.

Further, calculating unit 310 may be configured to calculate a distance between first character 120 and second character 130 in the virtual game space. In some embodiments, calculating unit 310 may be configured to calculate the distance between first character 120 and second character 130 based at least in part on a current position of first character 120 and a current position of second character 130.

Further, calculating unit 310 may be configured to calculate a level of detail for first character 120 positioned in the same virtual game space as second character 130, based at least in part on at least one of the calculated degree of closeness between first character 120 and second character 130 or the calculated distance between first character 120 and second character 130. In some embodiments, as the calculated degree of closeness between first character 120 and second character 130 is the higher, calculating unit 310 may be configured to determine a level of detail for first character 120 to be the higher. Further, as the calculated distance between first character 120 and second character 130 is the shorter, calculating unit 310 may be configured to determine a level of detail for first character 120 to be the higher.

Display definition control unit 320 may be configured to control a display property of first character 120 based at least in part on the calculated level of detail for first character 120. By way of example, but not as a limitation, the display property may include at least one of a display definition, a transparency, a visibility, a chroma, or a resolution. In some embodiments, display definition control unit 320 may be configured to control a number of polygons (e.g., vertices) used to render first character 120 based on the calculated level of detail for first character 120 in order to control the display definition of first character 120. Display definition control unit 320 may be configured to reduce the number of polygons, relative to a predefined standard number of polygons, as the calculated level of detail for first character 120 decreases. On the contrary, display definition control unit 320 may be configured to increase the number of polygons, relative to the standard number of polygons, as the calculated level of detail for first character 120 increases.

Further, display definition control unit 320 may be configured to control the number of polygons used to render first character 120, based in part on the calculated distance between first character 120 and second character 130 in the virtual game space. Display definition control unit 320 may be configured to reduce the number of polygons, relative to a predefined standard number of polygons, as the distance between first character 120 and second character 130 increases. On the contrary, display definition control unit 320 may be configured to increase the number of polygons, relative to the standard number of polygons, as the distance between first character 120 and second character 130 decreases.

Display definition control unit 320 may be further configured to control the number of polygons used to render first character 120 in real time or at predetermined time intervals, as calculating unit 310 calculates the level of detail for first character 120 and the distance between first character 120 and second character 130 in real time or at predetermined time intervals.

Graphic processing unit 330 may be configured to render first character 120 with the controlled number of polygons to be displayed on end device 100. In some embodiments, graphic processing unit 330 may be configured to encode an image of first character 120 into a video stream, and to transmit the video stream to end device 100. Then, a 2D or 3D image of first character 120, which is formed from the controlled number of polygons, may be displayed on end device 100.

Activity database 340 may be configured to store the history of mutual activity between first character 120 and second character 130. The history of mutual activity stored in activity database 340 may be updated in real time or at predetermined time intervals.

Character database 350 may be configured to store 2D or 3D images of multiple game characters. Further, character database 350 may be configured to store information regarding the multiple game characters. By way of example, but not as a limitation, the information regarding the multiple game characters may include a current position of respective one of the multiple game characters, a game species for the respective one of the multiple game characters, virtual game attributes for the respective one of the multiple game characters, virtual game skills for the respective one of the multiple game characters, or virtual game items with which the respective one of the multiple game characters are equipped.

Figure 4:
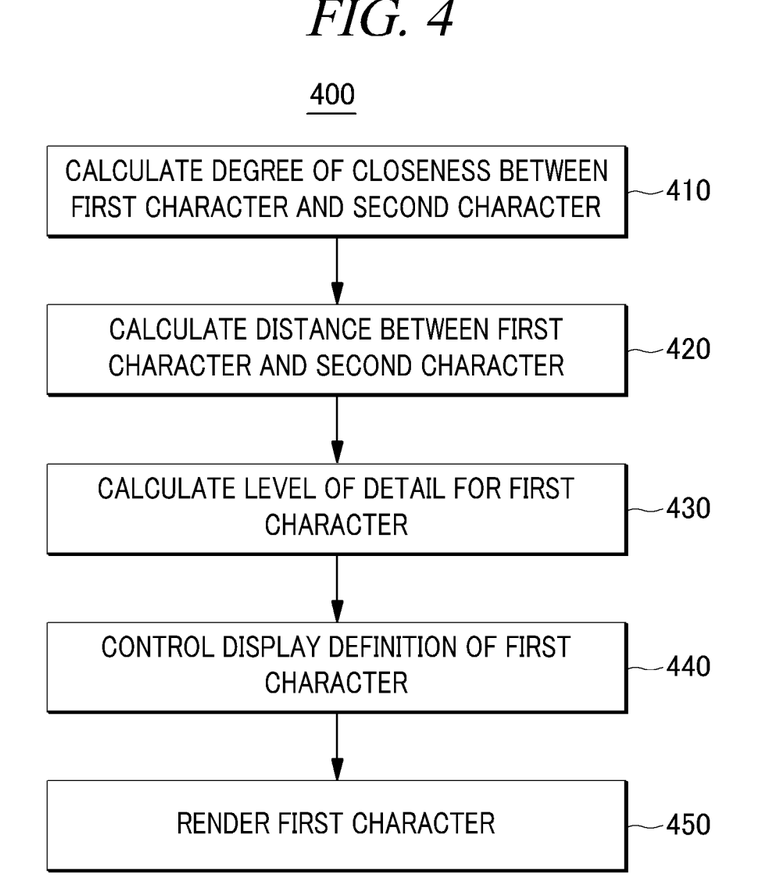
FIG. 4 schematically shows an example flow diagram of a process of a game server for rendering a game character, arranged in accordance with at least some embodiments described herein.

FIG. 4 schematically shows an example flow diagram of a process 400 of a game server 110 for rendering a game character, arranged in accordance with at least some embodiments described herein. The process in FIG. 4 may be implemented in environment 10 including end device 100 and game server 110, as illustrated in FIG. 1. An example process may include one or more operations, actions, or functions as illustrated by one or more blocks 410, 420, 430, 440 and/or 450. Although illustrated as discrete blocks, various blocks may be divided into additional blocks, combined into fewer blocks, or eliminated, depending on the desired implementation. Processing may begin at block 410.

At block 410 (Calculate Degree of Closeness Between First Character and Second Character), game server 110 may calculate a degree of closeness between first character 120 and second character 130, based at least in part on a history of mutual activity between first character 120 and second character 130 in a virtual game space. In some embodiments, game server 110 may calculate the degree of closeness between first character 120 and second character 130 in real time or at predetermined time intervals.

Non-limiting examples of the history of mutual activity may include at least one of first character 120 and second character 130 being included in a same character party for a predetermined amount of time, a frequency of occurrences in which first character 120 and second character 130 are included in the same character party, a frequency of occurrences in which first character 120 and second character 130 execute a collaborative attack against an opposing character (e.g., a monster character), or a frequency of occurrences in which first character 120 and second character 130 interact with each other (e.g., a chat between first character 120 and second character 130). Processing may proceed from block 410 to block 420.

At block 420 (Calculate Distance Between First Character and Second Character), game server 110 may calculate a distance between first character 120 and second character 130 in the virtual game space. In some embodiments, game server 110 may calculate the distance between first character 120 and second character 130, based at least in part on a current position of first character 120 and a current position of second character 130. Processing may proceed from block 420 to block 430.

At block 430 (Calculate Level of Detail for First Character), game server 110 may calculate a level of detail for first character 120 positioned in the same virtual game space as second character 130, based at least in part on at least one of the degree of closeness between first character 120 and second character 130, which is calculated at block 410, or the distance between first character 120 and second character 130, which is calculated at block 420. In some embodiments, as the calculated degree of closeness between first character 120 and second character 130 is the higher, game server 110 may determine a level of detail for first character 120 to be the higher. Further, as the calculated distance between first character 120 and second character 130 is the shorter, game server 110 may determine a level of detail for first character 120 to be the higher. Processing may proceed from block 430 to block 440.

At block 440 (Control Display Definition of First Character), game server 110 may control a display definition of first character 120 based at least in part on the level of detail for first character 120, which is calculated at block 430. In some embodiments, game server 110 may control a number of polygons (e.g., vertices) used to render first character 120 based in part on the calculated level of detail for first character 120 in order to control the display definition of first character 120. Game server 110 may reduce the number of polygons, relative to a predefined standard number of polygons, as the level of detail for first character 120 decreases. On the contrary, game server 110 may increase the number of polygons, relative to the standard number of polygons, as the level of detail for first character 120 increases.

Further, in some other embodiments, at block 440, game server 110 may control the number of polygons used to render first character 120 based in part on the distance between first character 120 and second character 130, which is calculated at block 420. Game server 110 may reduce the number of polygons as the distance between first character 120 and second character 130 increases. On the contrary, game server 110 may increase the number of polygons as the distance between first character 120 and second character 130 decreases. Processing may proceed from block 440 to block 450.

At block 450 (Render First Character), game server 110 may render first character 120 with the number of polygons, which is controlled at block 440, to be displayed on end device 100. In some embodiments, game server 110 may encode an image of first character 120 into a video stream, and transmit the video stream to end device 100. Then, a 2D or 3D image of first character 120, which is formed from the controlled number of polygons, may be displayed on end device 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
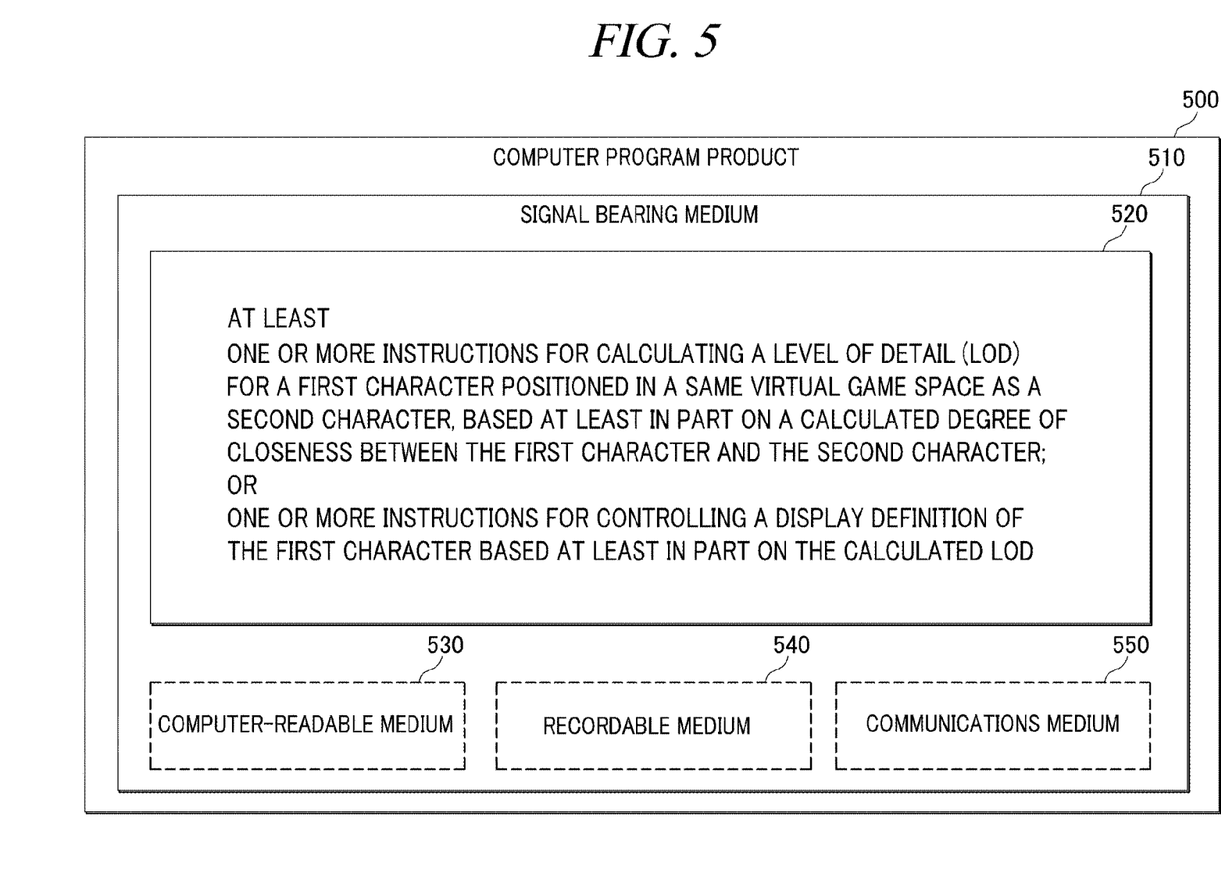
FIG. 5 illustrates computer program products that may be utilized to provide a game character rendering scheme, arranged in accordance with at least some embodiments described herein.

FIG. 5 illustrates computer program products that may be utilized to provide a game character rendering scheme, arranged in accordance with at least some embodiments described herein. Program product 500 may include a signal bearing medium 510. Signal bearing medium 510 may include one or more instructions 520 that, when executed by, for example, a processor, may provide the functionality described above with respect to FIGS. 1-4. By way of example, instructions 520 may include: one or more instructions for calculating a level of detail (LOD) for a first character positioned in a same virtual game space as a second character, based at least in part on a calculated degree of closeness between the first character and the second character; or one or more instructions for controlling a display definition of the first character based at least in part on the calculated LOD. Thus, for example, referring to FIG. 3, game server 110 may undertake one or more of the blocks shown in FIG. 4 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc.). Thus, for example, program product 500 may be conveyed to one or more modules of game server 110 by an RF signal bearing medium 510, where the signal bearing medium 510 is conveyed by a wireless communications medium 550 (e.g., a wireless communications medium conforming with the IEEE 802.11 standard).

Figure 6:
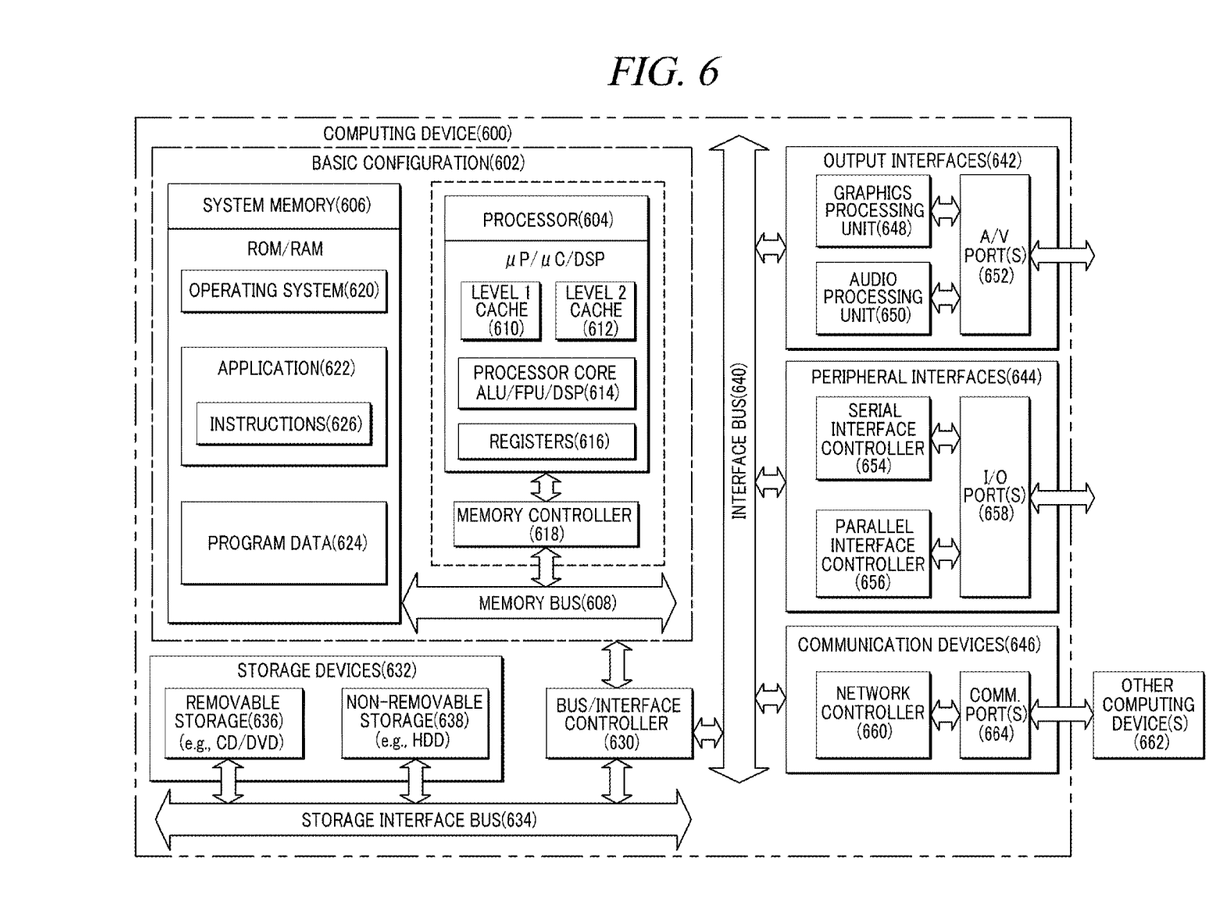
FIG. 6 is a block diagram illustrating an example computing device that may be utilized to provide a game character rendering scheme, arranged in accordance with at least some embodiments described herein.

FIG. 6 is a block diagram illustrating an example computing device that may be utilized to provide a game character rendering scheme, arranged in accordance with at least some embodiments described herein. In these examples, elements of computing device 600 may be arranged or configured for a device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), nonvolatile memory (such as ROM, flash memory, etc.) or any combination thereof.

System memory 606 may include an operating system 620, an application 622, and program data 624. Application 622 may include instructions 626 that may be arranged to perform the functions as described herein including the actions described with respect to game server 110 architecture as shown in FIG. 3 or including the actions described with respect to the flow charts shown in FIG. 4. In some examples, application 622 may be arranged to operate with program data 624 on an operating system 620 such that the schemes for rendering a game character.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a game server, the method comprising:
   calculating a degree of closeness between a first character and a second character positioned in a same space of a virtual game, wherein the calculating the degree of closeness is based at least in part on one of: a frequency of occurrences in which the first character and second character are included in a same character party or a frequency of occurrences in which the first character and the second character execute a collaborative attack against an opposing character, wherein each of the frequency of occurrences in which the first character and the second character are included in the same character party and the frequency of occurrences in which the first character and the second character execute the collaborative attack against the opposing character is assigned a different weight coefficient, wherein the calculating the degree of closeness is based on the assigned weight coefficient, and wherein the closeness corresponds to a relationship or communication between the first character and second character;
   calculating a level of detail (LOD) for the first character, wherein the calculation of the LOD is based at least in part on the calculated degree of closeness;
   controlling a display definition of the first character, wherein the controlling the display definition is based at least in part on the calculated LOD, and wherein the controlling the display definition includes controlling a number of polygons used to render the first character; and
   rendering the first character with the controlled number of polygons, to enable the first character to be displayed with different display definition, based on attention of a user, with respect to other characters positioned in the same space of the virtual game.

2. The method of claim 1, wherein the calculating the LOD is further based in part on a distance between the first character and the second character.

3. The method of claim 2, wherein the controlling the number of polygons includes:
   reducing the number of polygons, relative to a standard number of polygons, as the calculated LOD decreases; and
   increasing the number of polygons, relative to the standard number of polygons, as the calculated LOD increases.

4. The method of claim 2, wherein the controlling the number of polygons includes:
   reducing the number of polygons as the distance between the first character and the second character increases; and
   increasing the number of polygons as the distance between the first character and the second character decreases.

5. The method of claim 1, wherein the calculating the degree of closeness is executed in real time or at particular time intervals.

6. The method of claim 1, wherein the calculating the degree of closeness is further based on the first character and the second character being included in the same character party for a particular amount of time or a frequency of occurrences in which the first character and the second character interact with each other.

7. The method of claim 2, further comprising:
   calculating the distance between the first character and the second character based at least in part on a current position of the first character and a current position of the second character in the same space of the virtual game.

8. A game server, comprising:
   a calculation unit configured to:
   calculate a degree of closeness between a first character and a second character positioned in a same space of a virtual game, wherein the calculation of the degree of closeness is based at least in part on one of: a frequency of occurrences in which the first character and the second character are included in a same character party or a frequency of occurrences in which the first character and the second character execute a collaborative attack against an opposing character, wherein each of the frequency of occurrences in which the first character and the second character are included in the same character party and the frequency of occurrences in which the first character and the second character execute the collaborative attack against the opposing character is assigned a different weight coefficient, wherein the calculating the degree of closeness is based on the assigned weight coefficient, and wherein the closeness corresponds to a relationship or communication between the first character and second character; and calculate a level of detail (LOD) for the first character, wherein the calculation of the LOD is based at least in part on the calculated degree of closeness;

a display definition control unit configured to control, based at least in part on the calculated LOD, a display definition of the first character by control of a number of polygons used to render the first character; and a graphic processing unit (GPU) configured to render the first character with the controlled number of polygons, to enable the first character to be displayed with different display definition, based on attention of a user, with respect to other characters positioned in the same space of the virtual game.

9. The game server of claim 8, wherein the calculation unit is configured to calculate the level of detail (LOD) further based in part on a distance between the first character and the second character.

10. The game server of claim 9, wherein the display definition control unit is further configured to:

reduce the number of polygons, relative to a standard number of polygons, as the calculated LOD decreases; and increase the number of polygons, relative to the standard number of polygons, as the calculated LOD increases.

11. The game server of claim 9, wherein the display definition control unit is further configured to:

reduce the number of polygons as the distance between the first character and the second character increases; and increase the number of polygons as the distance between the first character and the second character decreases.

12. The game server of claim 8, wherein the calculation unit is configured to calculate the degree of closeness in real time or at particular time intervals.

13. The game server of claim 8, wherein the calculation of the degree of closeness is further based on the first character and the second character being included in the same character party for a particular amount of time or a frequency of occurrences in which the first character and the second character interact with each other.

14. A non-transitory computer-readable storage medium having stored thereon computer-executable instructions that, in response to execution, cause a game server to perform operations that comprise:

calculate a degree of closeness between a first character and a second character positioned in a same space of a virtual game, wherein the calculation of the degree of closeness is based at least in part on one of: a frequency of occurrences in which the first character and the second character are included in a same character party or a frequency of occurrences in which the first character and the second character execute a collaborative attack against an opposing character, wherein each of the frequency of occurrences in which the first character and the second character are included in the same character party and the frequency of occurrences in which the first character and the second character execute the collaborative attack against the opposing character is assigned a different weight coefficient, wherein the calculating the degree of closeness is based on the assigned weight coefficient, and wherein the closeness corresponds to a relationship or communication between the first character and second character;

calculate a level of detail (LOD) for the first character, wherein the calculation of the LOD is based at least in part on the calculated degree of closeness;

control a display definition of the first character, wherein the control of the display definition is based at least in part on the calculated LOD, and wherein the control of the display definition includes control of a number of polygons used to render the first character; and render the first character with the controlled number of polygons, to enable the first character to be displayed with different display definition, based on attention of a user, with respect to other characters positioned in the same space of the virtual game.

15. The non-transitory computer-readable storage medium of claim 14, wherein the calculation of the LOD is further based in part on a distance between the first character and the second character.

* * * * *